April 11, 1950

T. C. DUNLAP, JR
REFLEX CAMERA HAVING BUILT-IN
DIAPHRAGM CONTROL MEANS 2,504,011

Filed Aug. 21, 1947

Inventor

Thomas C. Dunlap, Jr.

By Clarence A. O'Brien
and Harvey B. Jacobson
Attorneys

April 11, 1950

T. C. DUNLAP, JR
REFLEX CAMERA HAVING BUILT-IN
DIAPHRAGM CONTROL MEANS 2,504,011

Filed Aug. 21, 1947

Inventor
Thomas C. Dunlap, Jr.

By Clarence A. O'Brien
and Harvey B. Jacobson
Attorneys

Patented Apr. 11, 1950

2,504,011

UNITED STATES PATENT OFFICE 2,504,011

REFLEX CAMERA HAVING BUILT-IN DIAPHRAGM CONTROL MEANS

Thomas C. Dunlap, Jr., Nashville, Tenn.

Application August 21, 1947, Serial No. 769,797

2 Claims. (Cl. 95—42)

This invention relates to reflex cameras, and has more particular reference to an improved device for controlling the diaphragm and focusing mirror of such a camera.

In the use of reflex cameras, it is inconvenient to manually reduce the diaphragm aperture immediately after focusing and before exposure, and the user of the camera may forget to reduce said aperture.

The primary object of the present invention, therefore, is to provide an improved device whereby the diaphragm may be latched in large aperture position and the mirror may be simultaneously latched in focusing position for the focusing operation, and whereby the diaphragm and mirror latching means may be tripped to allow the diaphragm to be automatically closed to a predetermined reduced aperture position and the mirror to be simultaneously automatically swung to exposure position.

A further object is to provide improved means to actuate the diaphragm for reducing its aperture and to predetermine the extent to which the diaphragm aperture will be reduced when the diaphragm is so actuated.

Other and more specific objects and features of the invention will become apparent from the following description when considered in connection with the accompanying drawings, in which.

Figure 1:
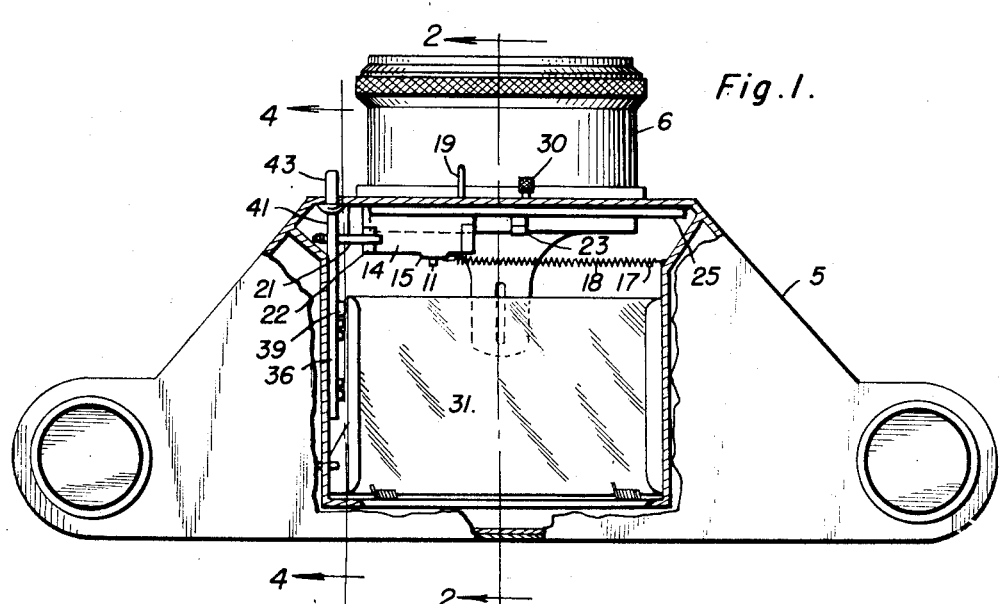
Figure 1 is a view, partly in top plan and partly broken away and in horizontal section, of a reflex camera embodying the present invention.
Figures 2, 3:
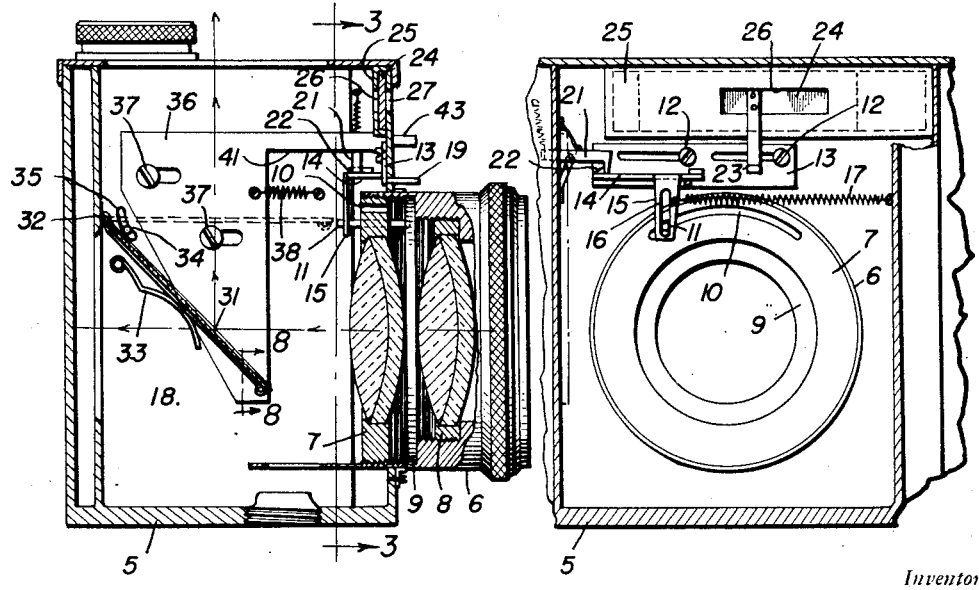
Figure 2 is a vertical section taken on line 2—2 of Figure 1.
Figure 3 is a vertical section taken on line 3—3 of Figure 2.
Figure 5:
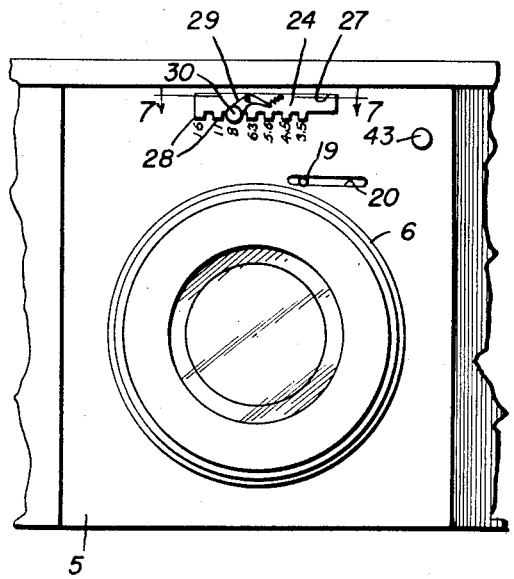
Figure 5 is a fragmentary front elevational view of the camera shown in Figure 1.
Figure 6:
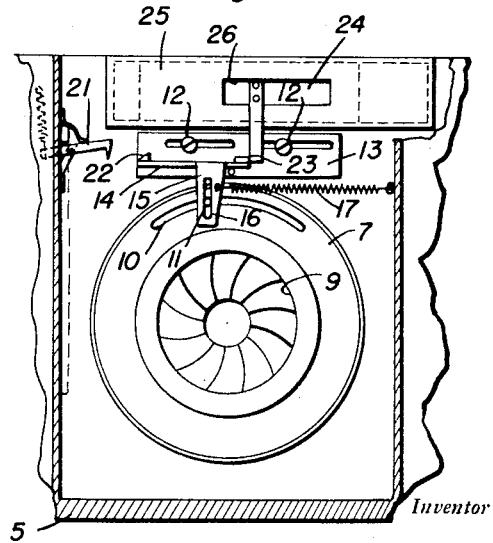
Figure 6 is a view somewhat similar to Figure 3 with the diaphragm in reduced aperture position.
Figure 8:
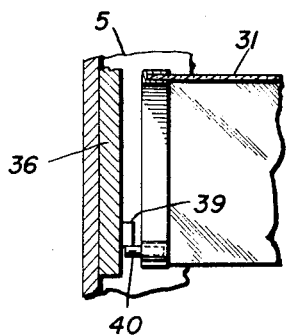
Figure 8 is a fragmentary vertical section taken on line 8—8 of Figure 2.

Referring in detail to the drawings, 5 indicates the casing of the camera provided in its front wall with the barrel mounting 6 of the lens carriers 7 and 8 and the iris diaphragm 9 arranged between said lens carriers. The rear lens carrier 7 is provided at the top with an arcuate elongated slot 10 concentric with the axis of barrel mounting 6, and a pin 11 which is rigid with the actuating ring of diaphragm 9 freely projects rearwardly through said slot. Mounted at 12 on the inner face of the front wall of casing 5, above the barrel mounting 6, for horizontal sliding movement, is a plate 13 provided on one end portion with a horizontal flange 14 from which depends an arm 15 provided with a vertical elongated slot 16 through which the rear end of pin 11 freely projects. A helical tension spring 17 has its ends respectively secured to a wall of the light chamber 18 and to the arm 15, so that the tension of said spring constantly tends to draw the plate 13 to the position of Figure 6 for operating the actuating ring of the diaphragm through the arm 15 and pin 11 to reduce the diaphragm aperture. The plate 13 may be manually moved in the opposite direction against the action of spring 17 so as to provide a large diaphragm aperture, and for this purpose the plate 13 is provided with a handle forming pin 19 which projects forwardly through a horizontal elongated slot 20 provided in the front wall of the camera casing. A spring pressed trigger catch 21 is pivoted to a side wall of the light chamber 18 and arranged to automatically engage a keeper 22 provided on the adjacent end of flange 14 so as to releasably latch the plate 13 in the position of Figure 3 wherein the diaphragm is adjusted to large aperture position.

To predetermine the extent to which the diaphragm aperture may be reduced when the plate 13 is released and moved by the spring 17, movement of said plate 13 by the spring 17 is adjustably limited by means of a horizontally adjustable stop arm 23 arranged in the path of the flange 14. This stop arm is carried by and depends from a slide 24 mounted in a housing 25 secured to the inner face of the front wall of casing 5 and having a slot 26 to allow the movement of said slide and said stop arm relative to the housing 25. Directly in front of the slide 24, the front wall of casing 5 is provided with a horizontal elongated slot 27, and a series of spaced notches 28 leading downwardly from the bottom of said slot 27. Pivoted to the front of slide 24 within the slot 27 is a spring pressed catch 29 normally swung to engage in the notch 28 registered with the active end thereof. It will thus be seen that by releasing the catch 29, slide 24 may be adjusted to adjust the position of stop arm 23 and thereby predetermine the extent to which the diaphragm may be reduced upon actuation of plate 13 by spring 17. The slide 24 constitutes a closure for the slots 26 and 27 so as to prevent passage of light through said slots into the camera. Catch 29 has a knob 30 to facilitate manual release thereof. It will also be apparent that plate 13 provides a closure for slot 20 so as to prevent passage of light into the camera through said slot 20.

Figure 4:
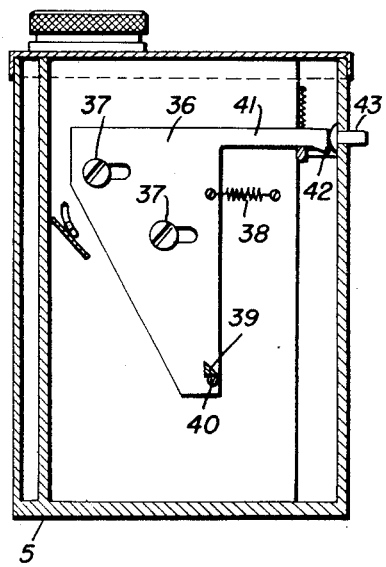
Figure 4 is a vertical section taken on line 4—4 of Figure 1.
Figure 7:
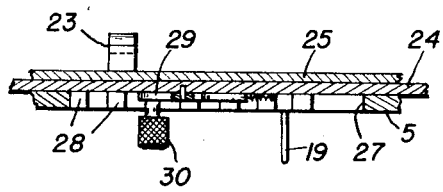
Figure 7 is an enlarged fragmentary horizontal section taken on the line 7—7 of Figure 5.

The usual focusing mirror 31 is hinged at 32 within the light chamber 18 of the camera, and an ordinary spring 33 is provided to swing said mirror upwardly to exposure position. Downward movement of the mirror to focusing position may be effected by suitable means including a laterally extending pin 34 that projects through an arcuate slot 35 in a wall of the light chamber 18. As is also well known in the art, the camera will have a focal plane shutter which is tripped by the mirror at the instant the latter reaches its raised position, to effect the exposure of the sensitized film provided in the camera. These two features are not illustrated or detailed in this application because they form no specific part of the present invention, but they are exemplified respectively in the U. S. Patent to K. Nuchterlein 2,165,903, July 11, 1939, and Dorr E. Felt No. 907,486, December 22, 1908. A plate 36 is slidably mounted at 37 upon a side wall of the light chamber 18 for horizontal movement and is yieldingly urged forwardly by means of a helical tension spring 38. At its lower end, the plate 36 is provided with a laterally projecting keeper lug 39 beneath which is adapted to automatically engage a lateral pin 40 rigid with and projecting from a side edge of the frame of mirror 31, when said mirror is swung downwardly to focusing position. The keeper lug 39 is of cam form as shown clearly in Figure 4 so that the pin 40 will cam downwardly past the same when the mirror 31 is swung downwardly, the spring 38 allowing slight rearward movement of plate 36 for this purpose. As soon as the pin 40 passes beneath the lug 39, plate 36 will be moved forwardly by spring 38 so that lug 39 will overlie pin 40 and hold the mirror in a lowered focusing position. Rigid with and projecting forwardly from the upper end of plate 36 is an arm 41 having a cam lug 42 on the lower edge of its forward end portion. When the plate 36 is in its forward position as shown, the lug 42 is a slight distance forwardly of catch or trigger 21 and arm 41 extends across the top of said catch or trigger. The arrangement is such that when the plate 36 is moved rearwardly, lug 39 is disengaged from pin 40 so as to allow the mirror 31 to be swung by spring 33 upwardly to exposure position. At the same time, cam lug 42 moves rearwardly and trips catch or trigger 21 so as to release plate 13 and permit spring 17 to move the latter for actuating the diaphragm 9 to reduce the aperture thereof. As before stated, the extent to which the aperture is so reduced may be predetermined by the adjustment of stop arm 23 through the means described. The reduction of the diaphragm aperture is effected intermediate the focusing operation and the exposure. It will be apparent that the tripping of the diaphragm controlling means will be simultaneous with the tripping of the focusing mirror, both being effected by the same movement of the plate 36 against the action of spring 38. It will also be apparent that the diaphragm aperture will be reduced to the required extent by the time that the complete raising of the mirror trips the focal plane shutter to make the exposure. In order to facilitate movement of the plate 36 against the action of spring 38, a push button 43 is slidably mounted in the front wall of casing 5 and bears against the front end of arm 41. Thus, upon rearwardly pressing the push button 43, plate 36 is moved rearwardly to the extent necessary to release the plate 13 and mirror 31 as described.

From the foregoing description, it is believed that the construction, operation and advantages of the present invention will be readily understood and appreciated by those skilled in the art. Modifications and changes in detail of construction are contemplated, such as fall within the scope of the invention as claimed.

Having described the invention, what is claimed as new is:

1. In a reflex camera, in combination, a casing, an adjustable diaphragm mounted at the front of said casing and having a pin projecting rearwardly from the actuating ring thereof into the front of the casing, a horizontally slidable plate mounted on the inner face of the front wall of the casing above the diaphragm and having a depending arm provided with a vertical elongated slot receiving said pin, a spring acting to move said plate transversely of the casing in one direction to operate the actuating ring of the diaphragm for reducing the aperture of the latter, the front wall of said casing having a horizontal elongated slot, a handle on said plate projecting forwardly through said slot in the front wall of the casing for use in moving the plate in the opposite direction to set the diaphragm with a large aperture, a manually releasable spring-pressed trigger carried by and mounted in the casing and engageable with an end of the plate for automatically latching said plate in the position wherein the diaphragm is set with a large aperture, a horizontally movable slide plate mounted on the inner face of said front wall above said first-named plate, a stop arm rigid with said slide plate and projecting into the path of a part of said first-named plate as moved by said spring, said front wall having an elongated slot and a series of notches leading from a longitudinal wall of said slot, and a spring-pressed latch carried by said slide plate and selectively engageable in any desired one of said notches to latch the slide plate in adjusted position and thereby predetermine the extent to which the diaphragm aperture is reduced by movement of said first-named plate by said spring.

2. In a reflex camera, in combination, a casing, an adjustable diaphragm mounted at the front of said casing and having a pin projecting rearwardly from the actuating ring thereof into the front of the casing, a horizontally slidable plate mounted on the inner face of the front wall of the casing above the diaphragm and having a depending arm provided with a vertical elongated slot receiving said pin, a spring acting to move said plate transversely of the casing in one direction to operate the actuating ring of the diaphragm for reducing the aperture of the latter, the front wall of said casing having a horizontal elongated slot, a handle on said plate projecting forwardly through said slot in the front wall of the casing for use in moving the plate in the opposite direction to set the diaphragm with a large aperture, a manually releasable spring-pressed trigger carried by and mounted in the casing and engageable with an end of the plate for automatically latching said plate in the position wherein the diaphragm is set with a large aperture, a spring raised focusing reflector, a plate mounted for horizontal sliding movement beside said reflector, means including a keeper lug carried by said last named plate for automatically latching the mirror in lowered focusing position, said last named plate having a forwardly projecting arm extending across said trigger and provided with a cam lug arranged to release said trigger upon rearward movement of said last named plate for release of the focusing mirror, a spring acting to move said last named plate forwardly to latch the mirror in focusing position and to disengage the cam lug from the trigger and thereby permit engagement of the trigger with the first-named plate, and manually operable means for moving said last named plate rearwardly against the action of its spring.

THOMAS C. DUNLAP, Jr.

REFERENCES CITED

The following references are of record in the file of this patent:

UNITED STATES PATENTS

| Number | Name | Date |
|---|---|---|
| 907,486 | Felt | Dec. 22, 1908 |
| 1,602,483 | Freeman | Oct. 12, 1926 |
| 1,791,112 | Azarraga | Feb. 3, 1931 |
| 2,236,925 | Steiner | Apr. 1, 1941 |
| 2,311,822 | Frankel | Feb. 23, 1943 |
| 2,397,915 | Bolsey | Apr. 9, 1946 |

FOREIGN PATENTS

| Number | Country | Date |
|---|---|---|
| 409,777 | Great Britain | May 10, 1934 |
| 212,868 | Switzerland | Dec. 31, 1940 |